(12) United States Patent
Pint

(10) Patent No.: US 7,338,054 B2
(45) Date of Patent: Mar. 4, 2008

(54) SELF-CONTAINED UTILITY CART

(76) Inventor: Eliana M. Pint, 716 Oakgrove Dr. #135, Branden, FL (US) 33510

( * ) Notice: Subject to any disclaimer, the term of this patent is extended or adjusted under 35 U.S.C. 154(b) by 327 days.

(21) Appl. No.: 11/107,705

(22) Filed: Apr. 18, 2005

(65) Prior Publication Data

US 2006/0232033 A1  Oct. 19, 2006

(51) Int. Cl.
B62B 1/06  (2006.01)
(52) U.S. Cl. .................... 280/79.2; 280/47.35
(58) Field of Classification Search ............ 280/47.35, 280/651, 47.19, 47.34, 47.17, 47.18, 47.28, 280/79.11, 79.2, 79.3
See application file for complete search history.

(56) References Cited

U.S. PATENT DOCUMENTS

| | | | | |
|---|---|---|---|---|
| 1,427,388 A | * | 8/1922 | Holley | 280/79.2 |
| 2,116,312 A | * | 5/1938 | Hollett | 280/79.2 |
| 2,555,178 A | * | 5/1951 | Young | 312/249.8 |
| 2,596,749 A | * | 5/1952 | Webber | 211/70.6 |
| 2,905,480 A | * | 9/1959 | Giovannelli | 280/659 |
| 3,460,850 A | * | 8/1969 | Franklin | 280/47.2 |
| 3,573,879 A | * | 4/1971 | Bergkamp et al. | 280/47.19 |
| 3,853,329 A | * | 12/1974 | McDonald | 280/47.35 |
| 4,350,366 A | * | 9/1982 | Helms | 280/655 |
| 5,452,908 A | * | 9/1995 | Bencic | 280/47.35 |
| 5,615,902 A | * | 4/1997 | Reurich | 280/47.18 |
| 5,820,146 A | * | 10/1998 | Van Ligten | 280/87.041 |
| 6,036,203 A | * | 3/2000 | Tyus et al. | 280/47.26 |
| 6,860,494 B1 | * | 3/2005 | Chisholm | 280/47.35 |
| 7,055,833 B2 | * | 6/2006 | Wixted et al. | 280/47.34 |
| 7,147,243 B2 | * | 12/2006 | Kady | 280/655 |

* cited by examiner

Primary Examiner—Christopher P. Ellis
Assistant Examiner—Bridget Avery
(74) Attorney, Agent, or Firm—David Kiewit

(57) ABSTRACT

A self-contained utility cart consisting of an upright casing that has forward and rearward areas and side areas. The casing has a multiple of compartments therein which can be accessible from the front or the rear of the cart. Some of the compartments are covered by hinged covers. The casing is supported by casters with some of them being stationary while others can swivel to enhance the maneuverability of the cart. The casters at the bottom of the rear area are so placed that their circumference extends beyond the rear area of the casing to aid in maneuvering raisers in stairways. On a rear area of the cart there is provided a trash bag holder that can be collapsed when not in use but can be stabilized in a horizontal position to receive a trash bag when in a deployed position.

2 Claims, 5 Drawing Sheets

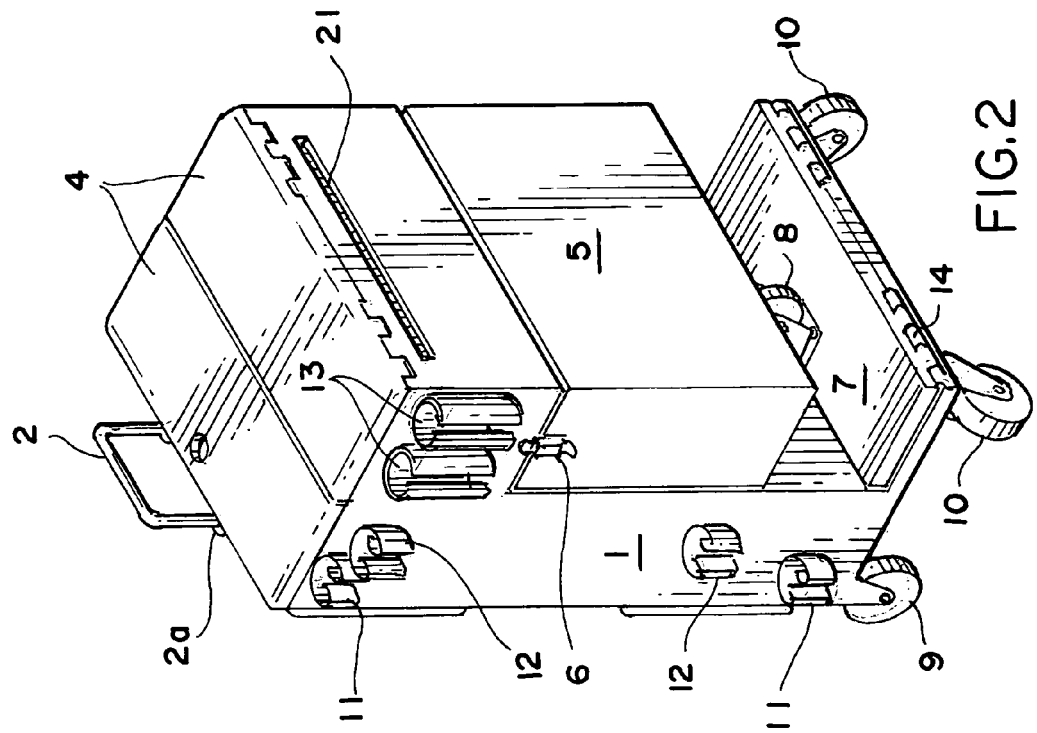
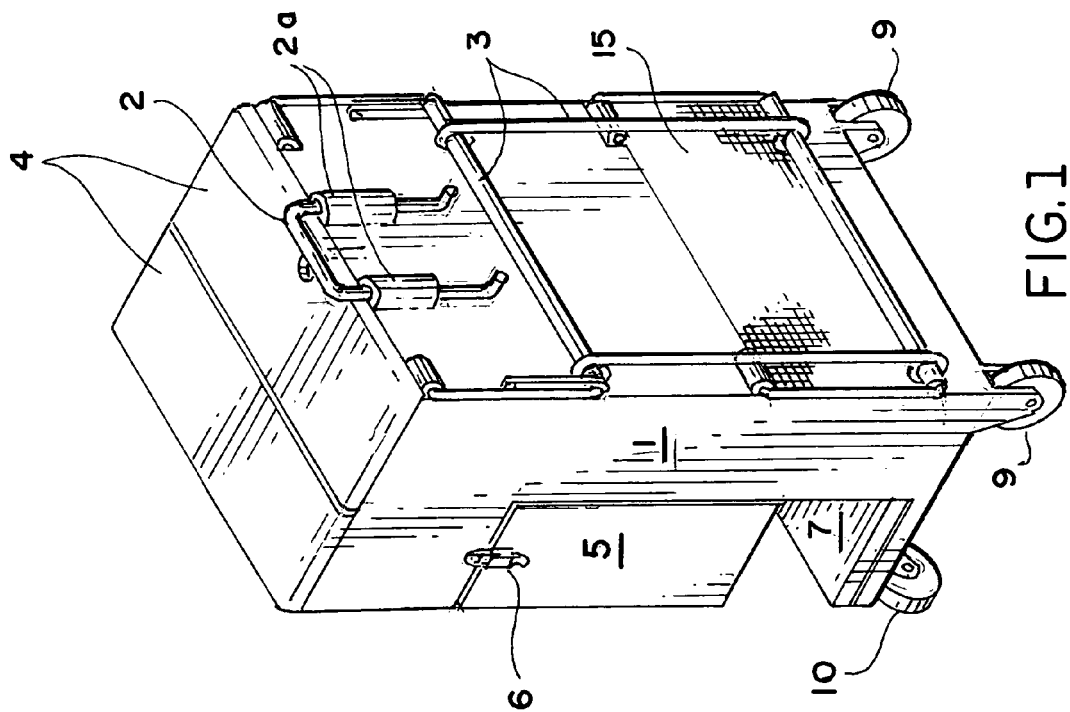

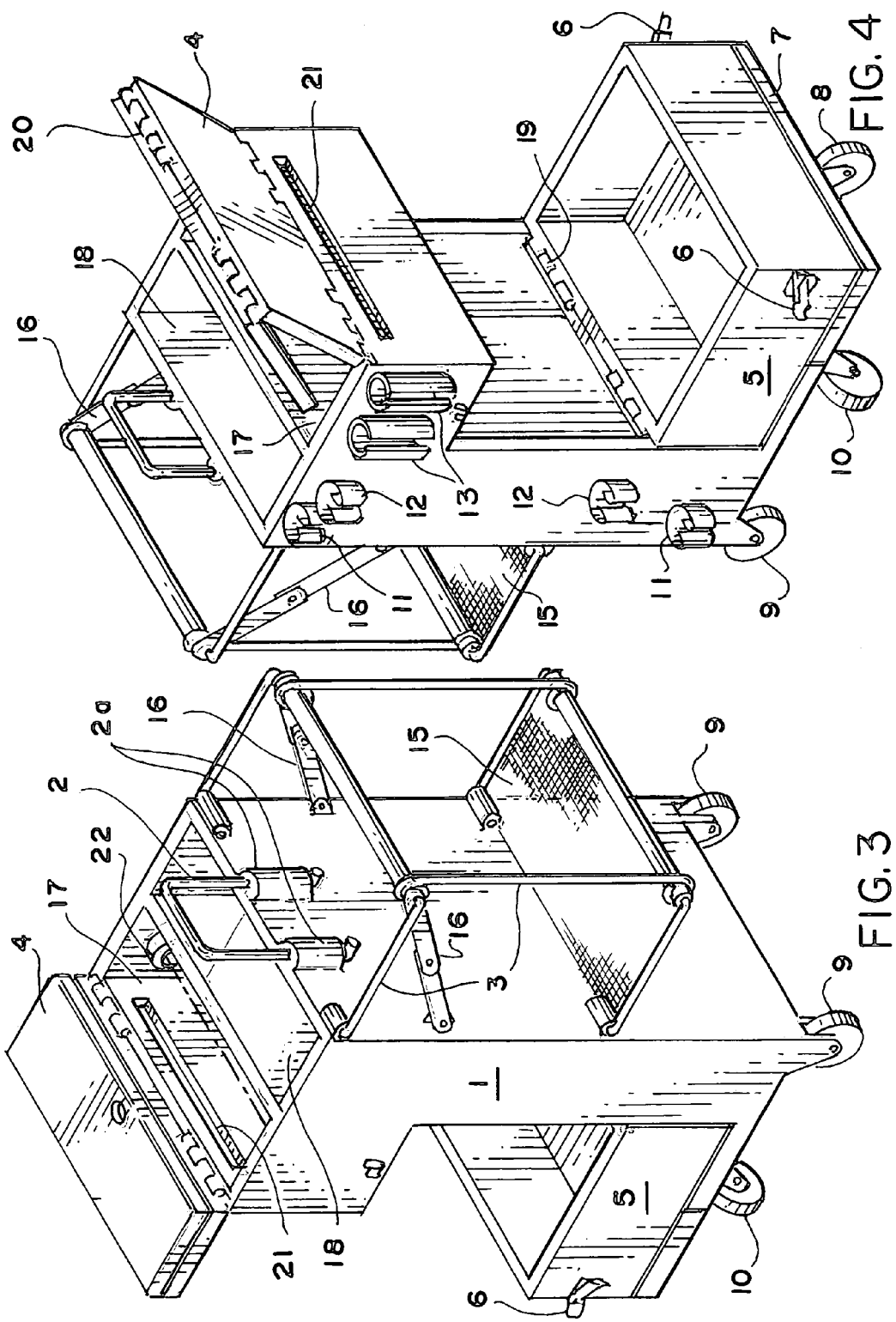

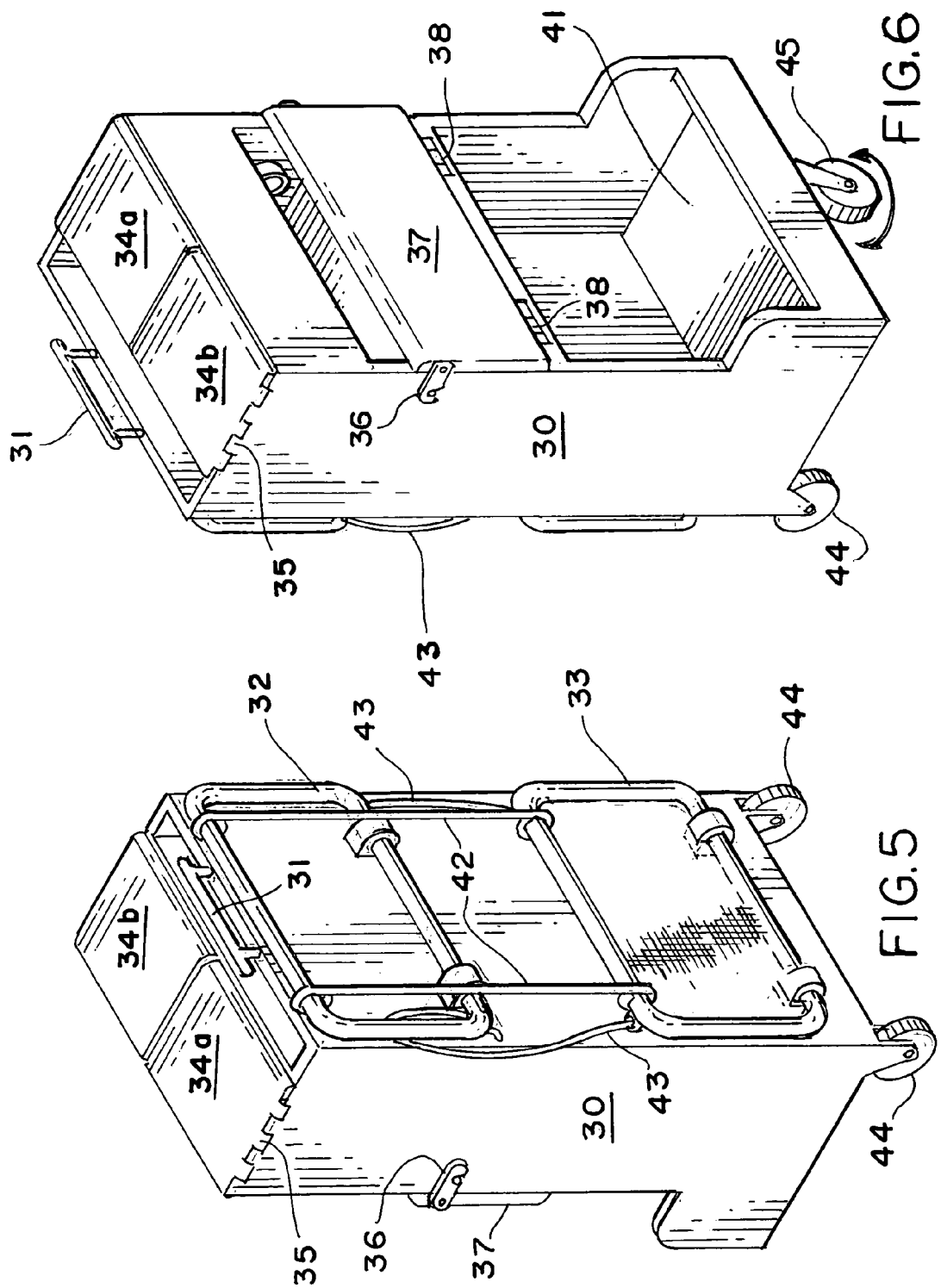

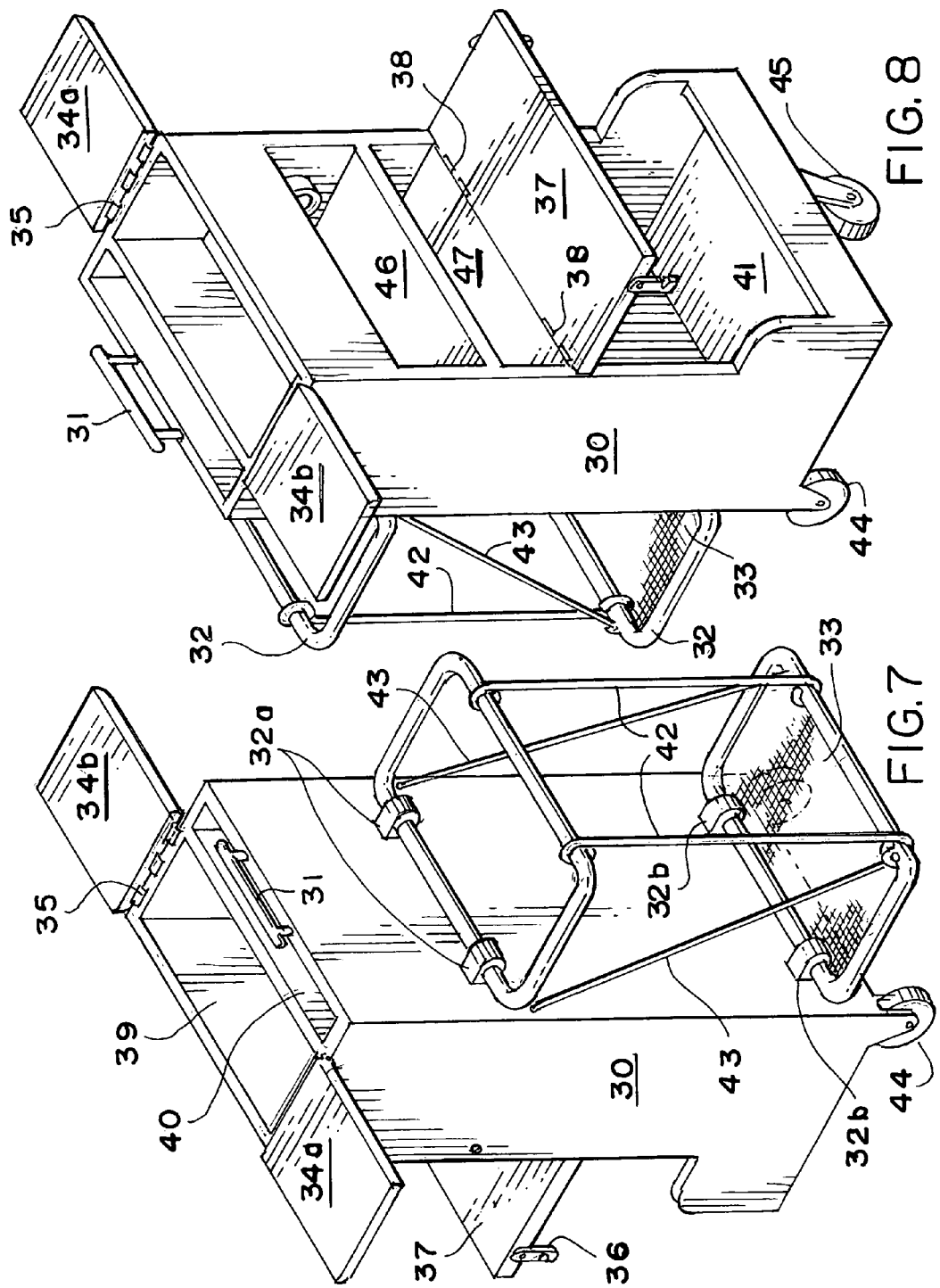

SELF-CONTAINED UTILITY CART

FIELD OF THE INVENTION

Utility carts are known to be used in many different fields. Professionals use utility carts such as plumbers, electricians, carpenters and/or painters. They are designed to hold as many items as possible that are special for that particular trade. Some of the trades use a bucket having a skirt draped around an upper section. That skirt has many compartments therein to hold long-handled tools as such pliers or files, etc. In the cleaning trade most of the above mentioned carts cannot be used because of the many different items required in cleaning certain establishments or households.

BACKGROUND OF THE INVENTION

The self-contained utility cart disclosed herein is directed to the cleaning trade for cleaning hotels, motels, office buildings or regular households. There are many items required when cleaning an establishment. Such items are different varieties of cleaning fluids, rags, paper towels different varieties of brushes, long-handled tools such as brooms or mops, short-handles tools such as brushes, scrapers or squeegees. Also required are buckets or containers in which to mix water with certain cleaning solutions. The above list of utensils and containers can vary depending on particular cleaning job requirements. Many cleaning persons use a wire cart similar to the known grocery carts with maybe a container for trash attached thereto. However, it can be seen that such carts cannot maintain an orderly display of all the different items needed on a cleaning job. The person arriving at a certain job location cannot anticipate every item needed to perform that job resulting in many trips to the vehicle in which he or she arrived.

BRIEF DESCRIPTION OF THE INVENTION

The inventive self-contained utility cart is so designed to carry most all cleaning requirements in an orderly fashion and on a ready display so that the cleaning job at hand can be successfully completed in a short period of time. The cart is so designed that it can be transported in a vehicle either standing up or lying on its back without disturbing any of the items contained therein. This feat is accomplished by having compartments or shelves within the cart that are covered in one way or another without any of the items contained therein falling out or creating a jumble of things. The utility cart is movable on wheels and the wheels are so designed to enable the cart to be moved up the raisers of a stairway.

BRIEF DESCRIPTION OF THE DRAWINGS

FIG. 1 is a perspective rear view of the utility cart;

FIG. 2 is a perspective front view of the utility cart;

FIG. 3 is a perspective rear view of the cart in an opened state or condition;

FIG. 4 is a perspective front view of the cart in an opened state or condition;

FIG. 5 is a perspective rear view of a different version of the utility cart;

FIG. 6 is a perspective front view of the cart shown in FIG. 5

FIG. 7 is a perspective rear view of the cart shown in FIG. 5 in an opened state or condition;

FIG. 8 is a perspective front view of the cart shown in FIG. 6 in an opened state or condition;

DETAILED DESCRIPTION OF THE INVENTION

Figure 10:
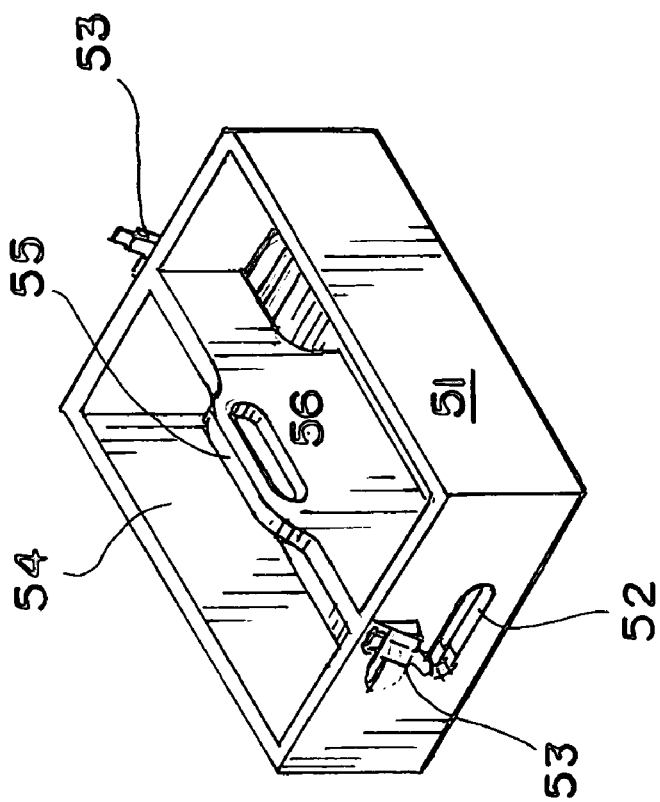
FIG. 10 is a perspective view of the cart shown in FIG. 9 with the top having been removed from the cart and turned upside down revealing a tray.

FIGS. 1 and 2 show the basic self-contained cleaning cart in a perspective view, wherein 1 is the basic cart consisting of an upstanding casing having front and rear areas and two side areas. At the rear side of the cart there is handle 2 which can be pulled up or pushed down because it is mounted in sleeves 2a. FIG. 1 also shows a collapsible trash bag holder 3 at its rear area which will be explained with referepce to FIG. 3. On top of the cart 1 there is a hinged cover 4 which consists of two halves. Below an overhang of the cart 1 there is a movable container 5 which is fastened to the cart 1 by way of the latches 6. The container 5 can be swung downwardly, as seen in FIGS. 3 and 4.

At a lower end of the cart 1 there is a foldable shelf 7 which is fastened to the lowest stationary shelf of the cart 1 by way of a hinge 14. When extended and hinged downwardly, the shelf 7 forms an extended shelf protruding from the cart 1. When hinged downwardly, the extended shelf 7 will be supported above the ground by a caster 8 which may swivel in all directions as indicated by the arrow. The caster 8 also contributes to the stability of the extended shelf 7 when heavy items are placed on the same such as a container of water. The rear area of the cart has casters attached thereto which can move only in a straight direction. However, it is noticed that the outer circumference of the caster wheel is somewhat protruding beyond the rear surface of the cart. This enables the cart to be moved up on a stairway because the outer circumference of the wheels 9 will encounter the raisers of the stairway. There is no dragging of the cart along the stairway but a rolling contact of the casters along the steps of the stairway.

On the frontal area of the cart and at the bottom thereof, there are mounted two caster wheels which may swivel in alt directions to thereby contribute to the steerability of the cart.

At 11 are shown upper and lower clamps on a side of the cart that can receive long- handled items such as a broom or a mop.

Then there are upper and lower clamps 12 which can receive short-handled tools such as scrapers or handled brushes. At 13, on a side of the cart 1, there are shown receptacles 13 which can receive spray bottles, spray cans or other items that can easily be slipped out of the receptacles 13.

FIGS. 3 and 4 show the self-contained utility cart 1 in an opened or extended state or condition. FIG. 3 shows the rear area. while FIG. 4. shows the frontal area. The same reference characters have been used as were with regard to the explanation of FIGS. 1 and 2. Both FIGS. show the lower extendible shelf 7 in an extended position and the caster 8 engaged with the ground. The trash bag holder 3 is shown in an a deployed position including the double links 16 which determine the stability of the deployed trash bag holder 3. The trash bag holder 3 also has a bottom 16 made of a fabric that forms the support for a trash bag placed thereon. On top of the utility cart 1, the foldable double cover 4 is shown in its open state to reveal two compartments 17 and 18. The foldable double cover 4 is held together by way of a hinge 20 (FIG. 4). The compartment 17 shows a paper towel holder 22 therein. Once the paper towel roll is placed thereon, the paper may be threaded through the slot 21 to be readily available for use from the outside of the cart. FIG. 4 also shows the movable container 5 in its extended state and is held in place by way of a hinge 19. As can be seen, when the container 5 is not in use, it can be fastened into the cart 1 and stored therein by way of the latch 6.

FIGS. 5 and 6 show a somewhat different version of the utility cart described with regard to FIGS. 1-4. The top of the cart is closed by two side by side covers 34a and 34b which are fastened to the top of the cart by way of the hinges 35. The two covers can be opened opposite to each other to reveal a storage compartment 39 there under which can receive many required cleaning items. In front of this compartment 39 there is a further compartment 40 which remains open because it cannot be covered by the two covers 34a and 34b.

The movable handle to manipulate the cart is shown at 31. The front area of the cart has an extendible shelf 37 which is held in place by latches 36 when not in use.

FIG. 8 shows the shelf 37 in an extended or downward position by way of the hinge 38 to thereby reveal two upper interior compartments 46 and 47 whereby items can be placed on the shelf 37 and be ready for use. FIGS. 6 and 8 also show a large lower compartment 41 which can be used to place a bucket or other container therein having water and a mixture of cleaning fluid therein for cleaning a floor, for example. As one progresses in the floor cleaning endeavor, one does not have to drag the bucket or container around because the cart with its casters can easily follow the person doing the cleaning. FIGS. 5-8 show casters 44 in the rear of the cart and a single swivel caster 45 in the front of the cart. The three caster arrangement enhances the maneuverability of the cart. Again, the circumferences of each of the two rear wheel casters 44 protrude somewhat beyond the outer surface of the rear area of the cart to enable a stair climbing effort, as was explained above.

FIGS. 5 and 7 show a different version of the collapsible trash bag holder 32. The collapsible trash bag holder 32 consists of an upper and a lower rectangular frame indicated by 32 which are each supported by hinges 32a and 32b. The two rectangular frames 32 are connected to each other by stays 42 which cause the rectangular frames to follow each other in to being deployed (FIG. 7). In order to stabilize the rectangular frames in a deployed position, at least two cables 43 are used with one end of cables being fastened to the rear wall of the cart and is then guided around the lower frame and then upwardly to the upper frame and fastened thereto. The length of the cables 43 determine the exact position of the two frames 32. It is preferred that this exact position be a horizontal. The lower frame 32 has a bottom support 33 to support a trash bag thereon.

Figure 9:
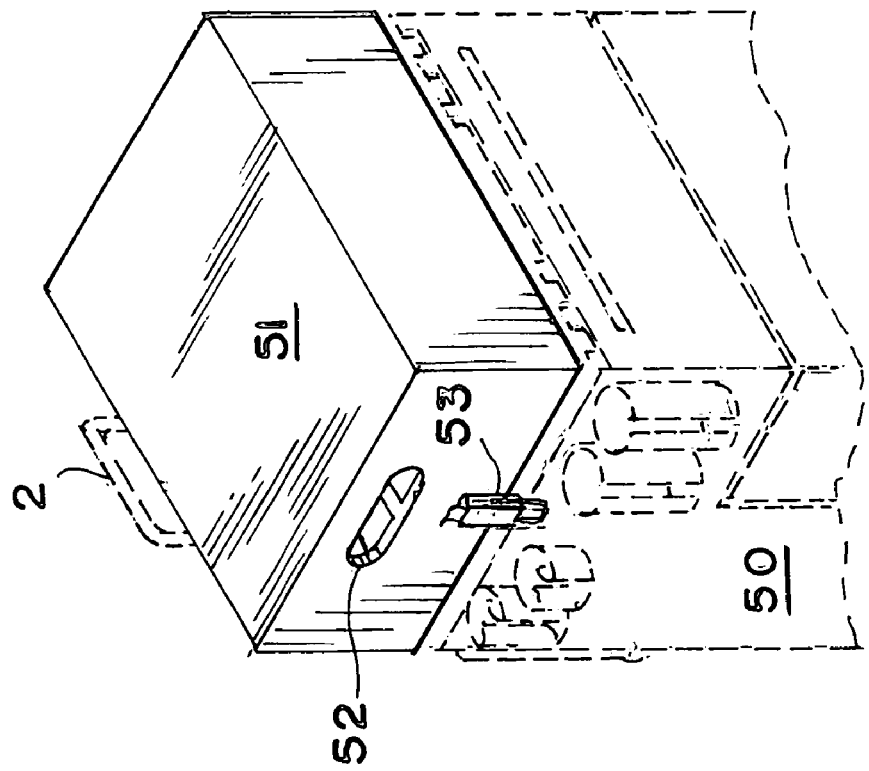
FIG. 9 is a perspective of the cart shown in FIG. 1 with a different top thereon.

FIGS. 9 and 10 show a different version of the top of the utility cart 1 as is shown in FIGS. 1-4. The utility cart in FIGS. 9 and 10 is shown at 50.

There is a rectangular box-like container 51 placed on top of the cart 50 and fastened thereto by latches 53. The container has hand holes 52 therein so that the container can easily be manipulated. When the latches 53 are opened and the container 51 is removed from the cart 50 and turned upside down, a container having an interior 54 is revealed. The interior 54 is subdivided into two compartments. The subdivider or partition is shown at 56 and has a carrying handle 55 therein so that the container can easily be carried to different locations with only a few necessary items therein for a minor cleaning job. The necessary items are normally stored in the top of the cart 50 when not in use and are taken therefrom when the carrier container is to be used.

The self-contained utility cart can be made of many different materials, with wood being preferred. However, the cart and its various components or some of its components could be made of a plastic material or aluminum. The latter material would contribute to a light weight construction of the cart.

The invention claimed is:

1. A utility cart comprising an upright casing having front and rear areas and two side areas, the cart comprising a plurality of compartments therein, the cart having a plurality of casters thereunder, the casters comprising at least one front swivel caster adjacent the front area and two fixed-direction casters adjacent the rear area, the cart further comprising an extension shelf hingedly attached to a lower portion of the front area and supported above ground, when extended, by an extension swivel caster attached thereto, the cart further comprising a box-like container hingedly connected to the front area of the cart so as to rest on the extension shelf when both the extension shelf and the box-like container are extended.

2. The utility cart of claim 1, wherein latches are provided to keep said box-like container within said casing when the box-like container is not extended.

\* \* \* \* \*